United States Patent [19]
Suzuki

[11] Patent Number: 5,521,662
[45] Date of Patent: May 28, 1996

[54] FILM VIEWER

[75] Inventor: Hiroaki Suzuki, Kanagawa, Japan

[73] Assignee: Fuji Photo Film Co., Ltd., Kanagawa, Japan

[21] Appl. No.: 380,576

[22] Filed: Jan. 30, 1995

[30] Foreign Application Priority Data

Feb. 4, 1994 [JP] Japan ................................ 6-012905

[51] Int. Cl.⁶ ............................ G03B 21/43; G03B 23/12
[52] U.S. Cl. ...................... 354/76; 354/212; 354/275; 353/26 R; 353/26 A; 353/98; 353/DIG. 2; 40/364; 40/367
[58] Field of Search .................... 354/212, 275, 354/75, 76, 77; 352/129; 353/26 R, 26 A, DIG. 2, 98, 99; 40/361, 364, 367, 471, 518

[56] References Cited

U.S. PATENT DOCUMENTS

| | | | |
|---|---|---|---|
| 3,104,483 | 9/1963 | Thompson et al. | 40/364 |
| 3,522,672 | 8/1970 | Hinds | 40/364 |
| 3,844,642 | 10/1974 | Peters | 353/26 R |
| 4,059,351 | 11/1977 | Wisotsky | 40/364 |
| 4,073,581 | 2/1978 | Rayburn | 352/129 |
| 4,234,244 | 11/1980 | Klein | 40/367 |
| 4,255,026 | 3/1981 | Ebener | 353/26 R |
| 5,093,686 | 3/1992 | Shigaki | 355/77 |
| 5,191,371 | 3/1993 | Shigaki | 354/275 |
| 5,424,790 | 6/1995 | Tsunefuji | 353/26 A |

FOREIGN PATENT DOCUMENTS 3175448  7/1991  Japan.

Primary Examiner—A. A. Mathews
Attorney, Agent, or Firm—Sughrue, Mion, Zinn, Macpeak & Seas

[57] ABSTRACT

A film viewer for viewing a film which has been withdrawn from a cartridge. Its main body has a cartridge accommodating portion. In the film viewer, a rotating shaft connected to a spool of the cartridge and a winding shaft which winds the film are driven by manual operation or a motor to convey the film. A window portion is provided at the main body for viewing the conveyed film guided by a film guide made of a flexible material. The film viewer has a distinguishing piece or sensor for distinguishing whether or not the film has been developed.

13 Claims, 11 Drawing Sheets

FIG. 2
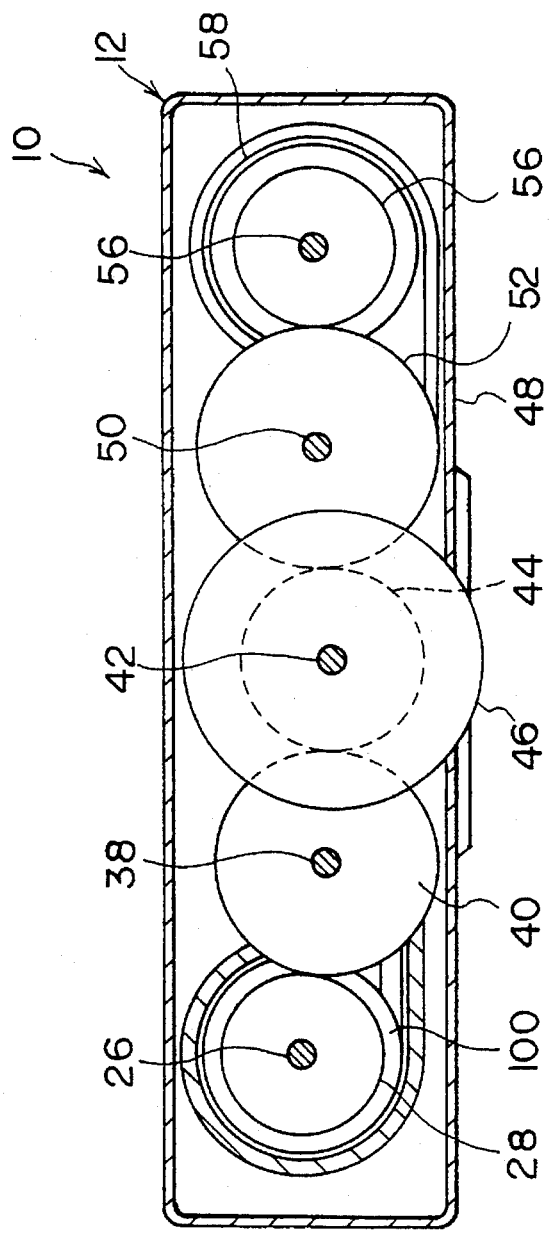
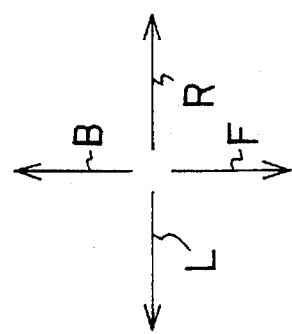

FILM VIEWER

BACKGROUND OF THE INVENTION

1. Field of the Invention

The present invention relates to a film viewer for unloading, from a cartridge, a film accommodated therewithin, and for viewing the film.

2. Description of the Related Art

Conventionally, when, at a printing shop, a customer requests development of and prints from a 35 mm film which has been photographed, prints and a negative film are returned to the customer. In general, the negative film to be returned is cut by every six frames and accommodated within an accommodating portion of a transparent negative film case.

When an extra printing process or the like at a processing laboratory is considered, it is more efficient to handle the film accommodated within a cartridge than the film cut by every six frames (e.g., it is unnecessary to load one film in a printer or the like more than once). In addition, in a film having a magnetic layer, which has been proposed in recent years (see "Shashin Kogyo" (Photographic Industries), July 1993, pp. 34–35), it is difficult to read magnetic information of the negative film which has been separated. Accordingly, a method of accommodating and returning the developed film within the cartridge has been proposed (see Japanese Patent Application Laid-Open No. 3-175448).

When the film is completely accommodated within the cartridge, a determination is not made as to whether the film inside has been developed. As a result, there is a possibility of erroneously exposing the undeveloped film. Accordingly, a cartridge having an indicator, which indicates whether the film has been developed, has been proposed. However, in this case, there is a possibility of overlooking or mistakenly recognizing the indicator of the cartridge.

Further, the uncut film is long and is not easily handled so that it is difficult for an ordinary user to withdraw the film from the cartridge and view its images. Moreover, when the film is withdrawn from the cartridge, there is a possibility of deteriorating the image quality by thumbing the surfaces of the images, or by scratches or the like on the film.

SUMMARY OF THE INVENTION

With the aforementioned in view, an object of the present invention is to provide a film viewer which prevents the undeveloped film from being exposed.

Another object of the present invention makes it possible to view the film accommodated within the cartridge without deteriorating the image quality.

The invention is a film viewer for viewing a film which has been withdrawn from a cartridge, comprising: a rotational shaft which is connected to a spool of said cartridge; a winding shaft which winds said film; a main body which supports said rotational shaft and said winding shaft such that said rotational shaft and said winding shaft are rotatable; a cartridge accommodating portion which is provided at said main body and which accommodates said cartridge; a window portion for viewing which is provided between said rotational shaft and said winding shaft and which is at least as large as one image frame of said film; a film guide which is made of a flexible material, said film guide being mounted to said main body and disposed in a vicinity of an entrance/exit port for the film of said cartridge so as to guide said film; a conveying means which is provided so as to connect directly or indirectly said rotational shaft and said winding shaft, or which is provided at each of said shafts, said conveying means conveying said film while driving the shafts; and a distinguishing means which is provided at said main body, said distinguishing means distinguishing whether the film has been developed, from at least one of the film itself and an indicating means, which is provided at the cartridge and which indicates whether the film within the cartridge has been developed.

In the embodiment wherein said indicating means distinguishes whether the film has been developed by detecting said indicating means, and in a case in which the film is undeveloped, said distinguishing means prevents the cartridge from being accommodated, in order to view the film within the cartridge by the film viewer, the film is first accommodated within the cartridge accommodating portion. At that time, since the distinguishing means detects the indicating means, which indicates whether the film provided at the cartridge has been developed, the cartridge within which the undeveloped film is accommodated can be prevented from being accommodated. The undeveloped film can be thereby prevented from being exposed.

The cartridge, within which a developed film is accommodated, is loaded into the cartridge accommodating portion; the rotational shaft is connected to the spool; and the rotational shaft and the winding shaft are rotated by the conveying means so as to convey the film. Accordingly, the film can be viewed from the window portion for viewing which is provided between the rotational shaft and the winding shaft. The film guide, which is made of a flexible material and guides the film, is provided in the vicinity of the entrance/exit port for the film of the cartridge. Therefore, even if a teremp or the like is not provided at the cartridge, the film which has been just withdrawn from the cartridge is immediately guided by the film guide made of a flexible material so as to make it possible to prevent deterioration of the image quality due to scratches or the like. In addition, since the window portion for viewing is larger than one image frame, it is possible to view not only the entire image, but also frame numbers provided at the transverse direction end portions of the film, and optical information such as a bar code. Further, it is also possible to view the result of an accident such as fog, or unsatisfactory conveying of the film in a camera, or unsatisfactory positioning of a camera at the time of photographing.

The distinguishing means is not limited to the above aspect. For example, the distinguishing means may be a sensor which is provided in the vicinity of the cartridge accommodating portion and which detects whether the film has been developed. In this case, if the sensor detects that the film has not been developed, the conveying means may be controlled so as to prevent the film from being conveyed.

The film viewer of the present invention structured as described above achieves a superior effect in that an undeveloped film is prevented from being exposed, and a film accommodated within the cartridge can be viewed more easily and without deteriorating the image quality.

BRIEF DESCRIPTION OF THE DRAWINGS

FIG. 2 is a cross-sectional view, taken along line 2—2, of the film viewer shown in FIG. 1.

DESCRIPTION OF THE PREFERRED EMBODIMENTS

A film viewer according to a first embodiment of the present invention will be described in accordance with FIGS. 1 through 6.

Figure 4:
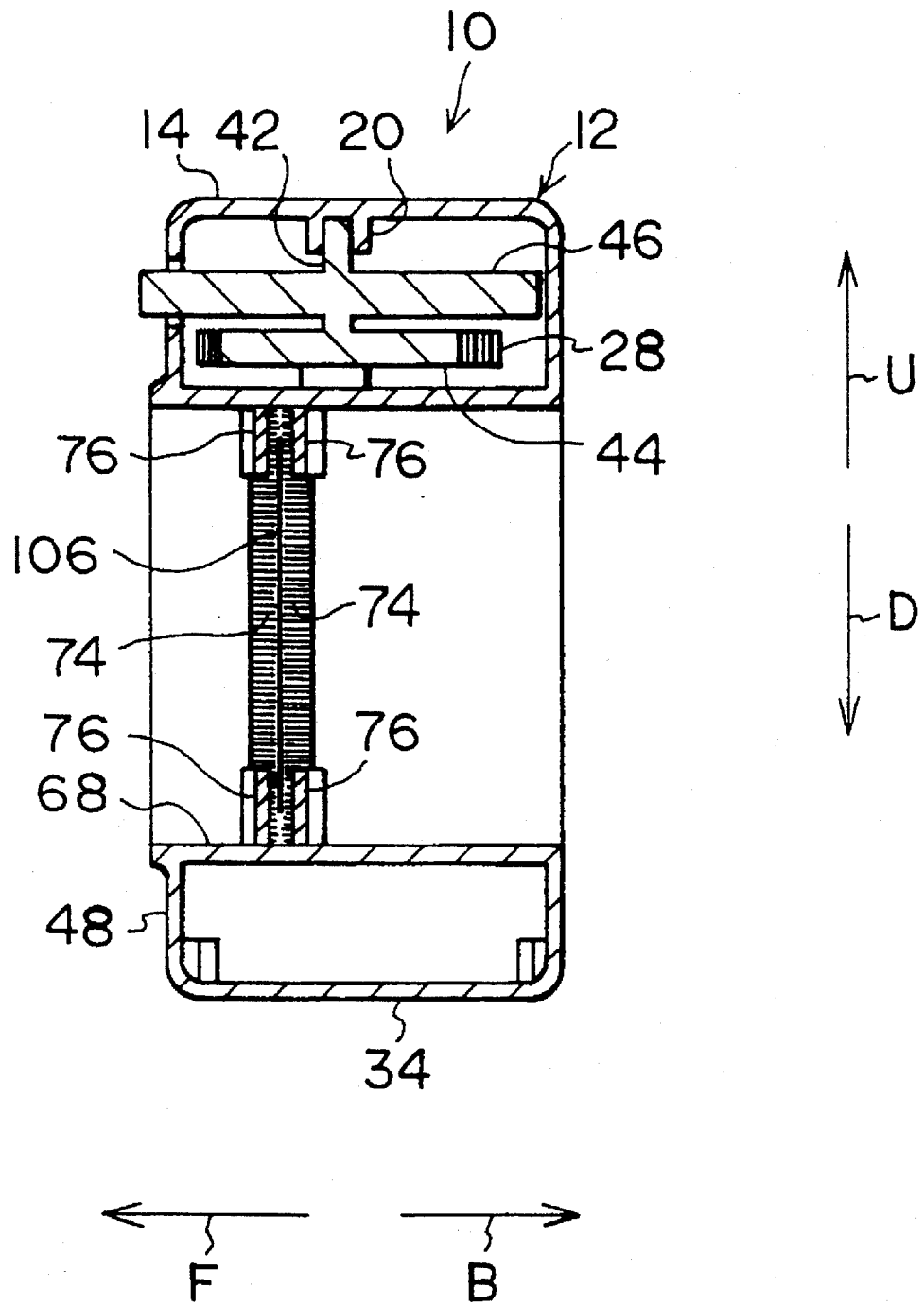
FIG. 4 is a cross-sectional view, taken along line 4—4, of the film viewer shown in FIG. 1.
Figure 5:
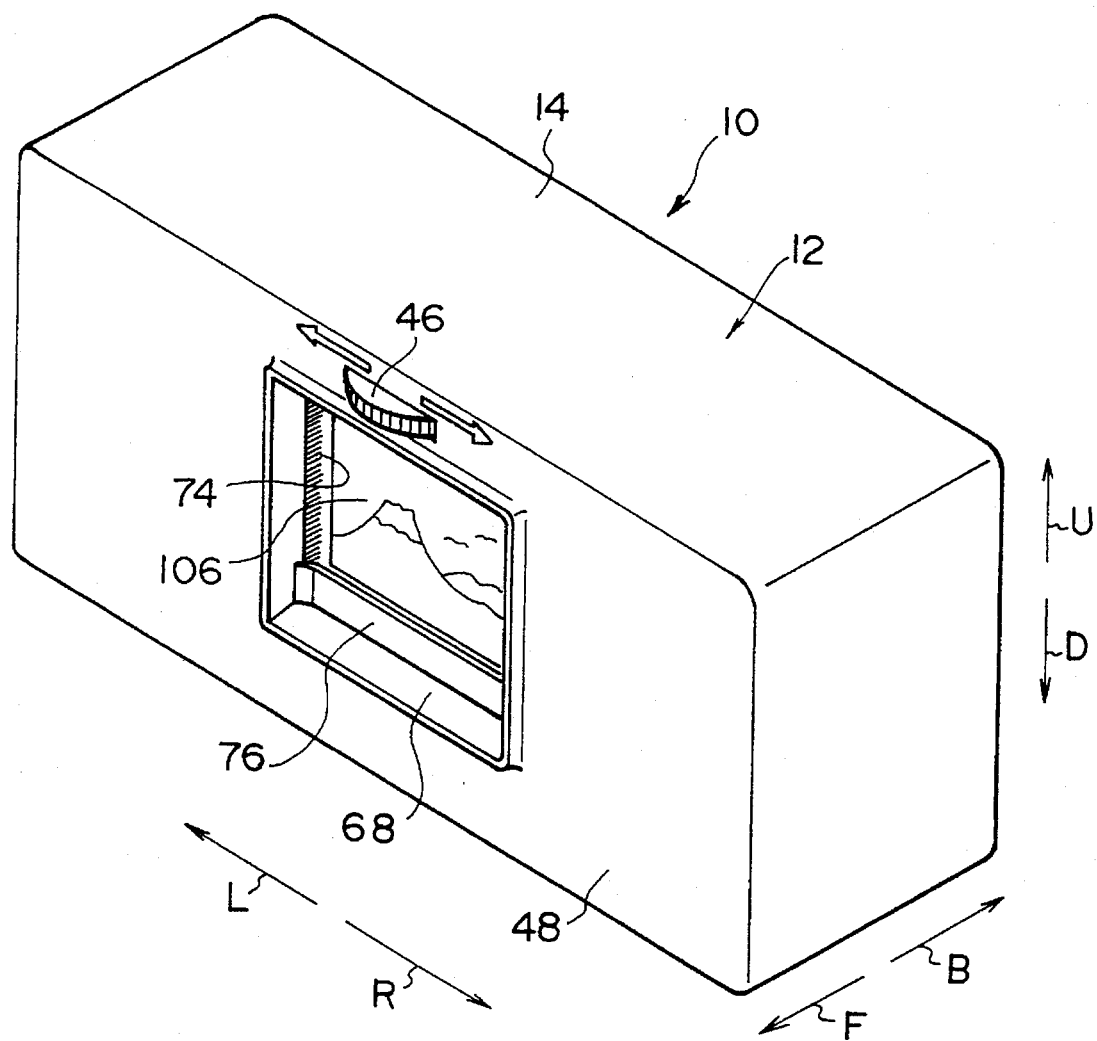
FIG. 5 is a perspective view of the film viewer.

As illustrated in FIG. 4, a film viewer 10 includes a main body case 12 which is formed into a rectangular box shape.

Figure 1:
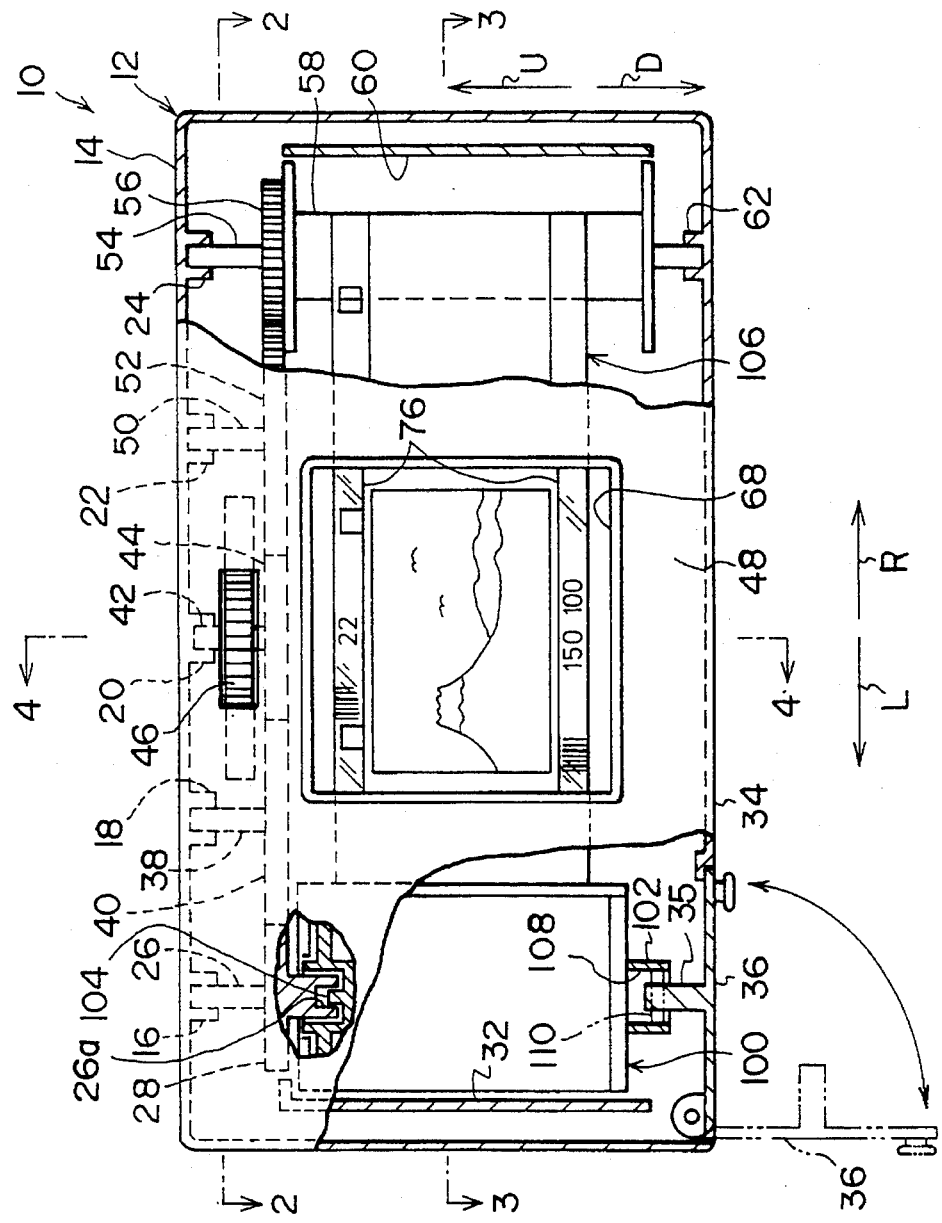
FIG. 1 is an elevational view of a film viewer according to a first embodiment.

As illustrated in FIG. 1, bearing portions 16, 18, 20, 22, and 24 are provided at predetermined intervals, along a transverse direction (the direction of arrow L and the direction of arrow R) of the main body case 12, at an inner side of a top plate 14 of the main body case 12.

One end of a shaft 26, which extends in the vertical direction (the direction of arrow U and the direction of arrow D) of the main body case 12 and serves as a rotational shaft, is rotatably supported by the bearing 16, which is at the side of the direction of arrow L. A gear 28 (the teeth are unillustrated), Which forms a portion of conveying means, is fixed to the intermediate portion of the shaft 26. A cartridge accommodating concave portion 32, which serves as a portion accommodating a cartridge 100, is formed at a lower side of the gear 28 (the direction of arrow D). The cartridge accommodating concave portion 32 is opened at a bottom plate 34 side and is closed by a bottom cover 36.

Figure 6:
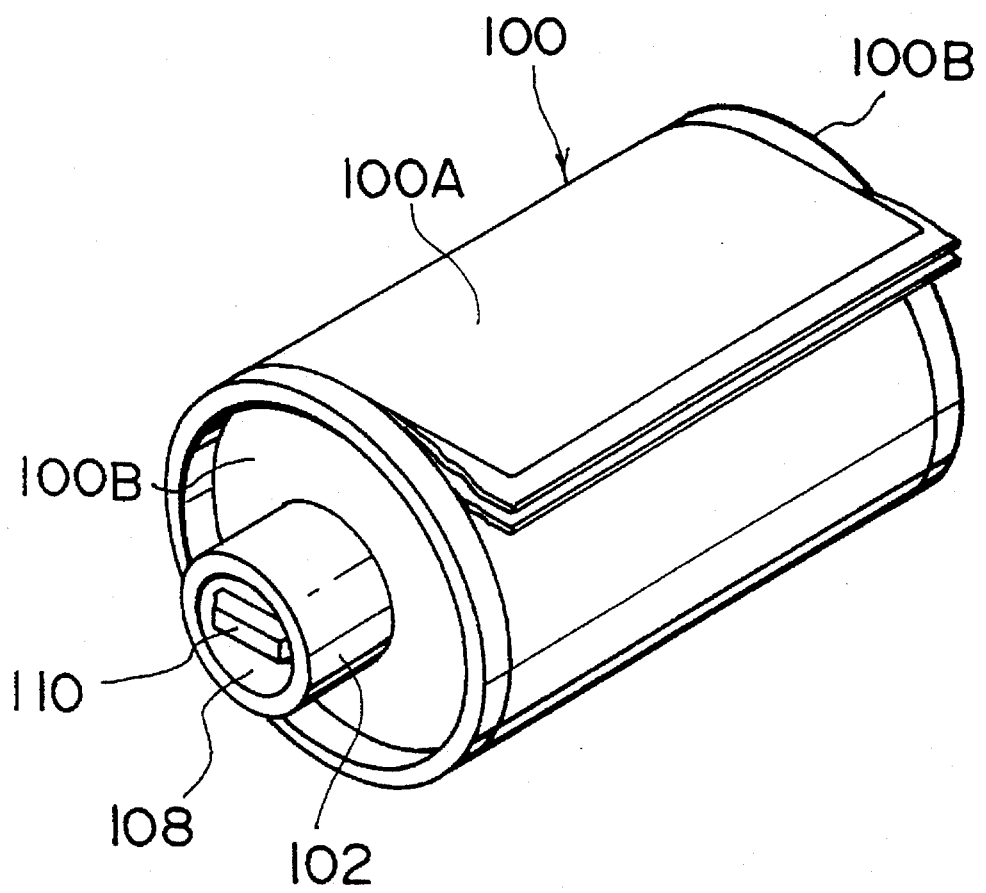
FIG. 6 is a perspective view of a cartridge.

As illustrated in FIG. 6, the cartridge 100 of the present embodiment has a general structure in which annular covers 100B are at both ends of a cylindrical portion 100A. Into it a spool 102, on which a film 106 (unillustrated in FIG. 6) is wound, is inserted. However, the structure of the cartridge 100 is different from conventional ones in that the cartridge 100 includes a rectangular post 110, which serves as a means which indicates whether the film has been developed. The post 110 is bridged in the cavity of a concave portion 108, which is formed at one end of the spool 102. Only the end portions of the post 110 are thin. Therefore, by pushing hard the intermediate portion of the post 110, the post 110 is removed from the spool 102. For example, when the film 106 within the cartridge 100 has been developed, by removing the post 110 from the spool 102 at the laboratory or the like, a determination can be easily made from outside as to whether the film 106 has been developed. Accordingly, the post 110 is useful in preventing the undeveloped film from being exposed.

As illustrated in FIG. 1, the other end portion of the shaft 26 projects into the cartridge accommodating concave portion 32. A slit 26a, which engages a rib 104 provided at one end of the spool 102 of the cartridge 100, is formed at a distal end of the shaft 26. The rib 104 engages a winding shaft (unillustrated) of the camera and thus it is also used when the film 106 is taken up.

A projection 35, which serves as a preventing means, is provided at the surface of the bottom cover 36, opposed to the cartridge accommodating concave portion 32. When the cartridge 100 is loaded into the cartridge accommodating concave portion 32 and then the bottom cover 36 is closed, the projection 35 opposes the concave portion 108 of the spool 102. As illustrated in FIG. 1, when the post 110 is removed, the bottom cover 36 is closed to permit the cartridge 100 to be accommodated within the cartridge accommodating concave portion 32. When the post 110 is not removed, the projection 35 impinges the post 110 and thus the bottom cover 36 is not closed. Therefore, the cartridge 100 cannot be accommodated within the cartridge accommodating concave portion 32.

As illustrated in FIG. 1, one end of a shaft 38 is rotatably supported by the bearing 18. A gear 40 (the teeth are unillustrated), which serves as the other portion of the conveying means and engages the gear 28, is fixed to the intermediate portion of the shaft 38.

One end of the shaft 42 is rotatably supported by the bearing 20. The gear 44 (the teeth are unillustrated), which serves as the other portion of conveying means and engages the gear 40, is fixed to the other end of the shaft 42. A disc-shaped knob 46 serving as the other portion of the conveying means is fixed to the intermediate portion of the shaft 42. As shown in FIG. 2, a portion of the knob 46 projects outwardly from a front plate 48 of the main body case 12.

As shown in FIG. 1, one end of a shaft 50 is rotatably supported by the bearing 22 and the other end of the shaft 50 is rotatably supported by the bearing, which is mounted at the bottom plate 34. A gear 52 (the teeth are unillustrated), which serves as the other portion of the conveying means and engages the gear 44, is fixed to the intermediate portion of the shaft 50.

Figure 3:
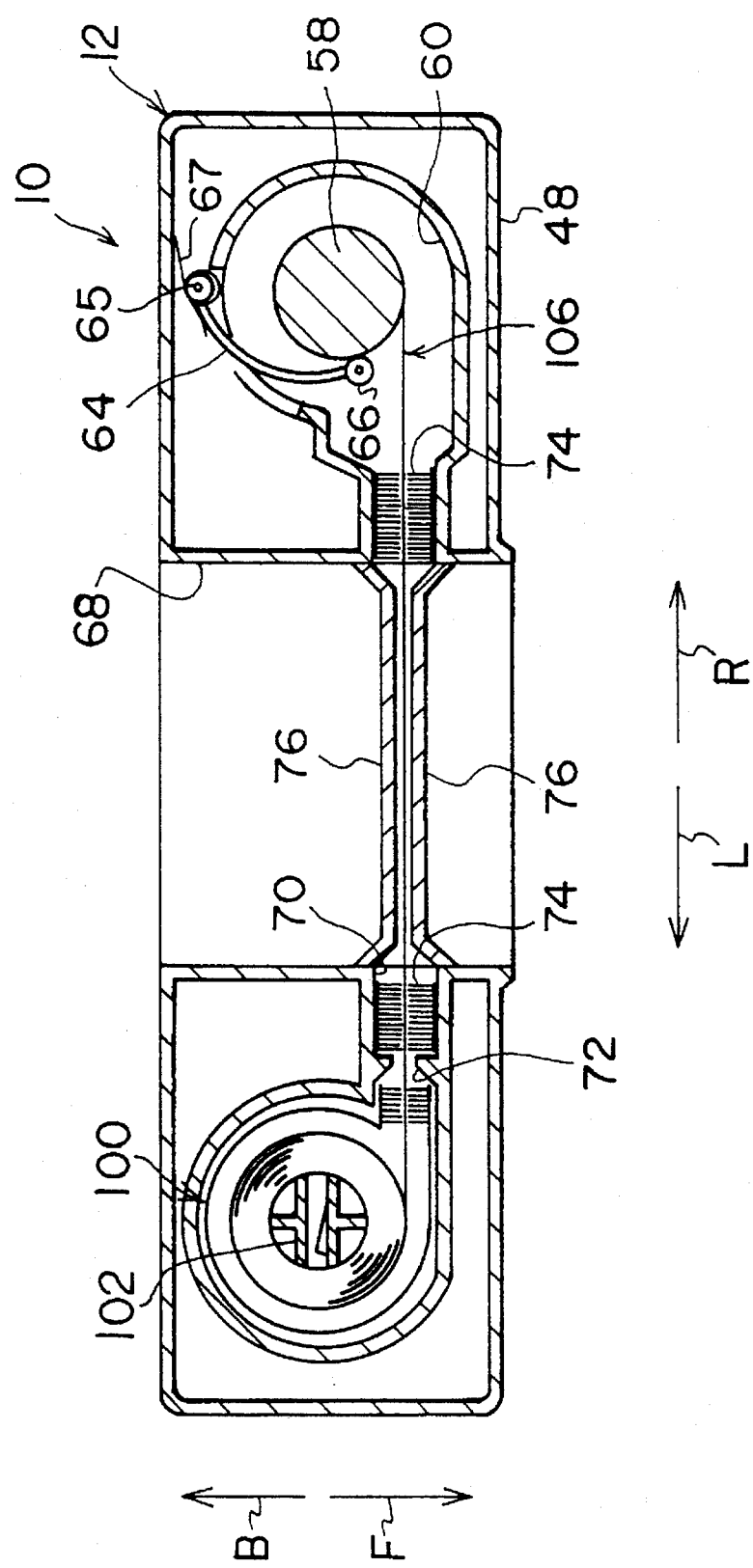
FIG. 3 is a cross-sectional view, taken along line 3—3, of the film viewer shown in FIG. 1.

Moreover, one end of a shaft 54 is rotatably supported by the bearing 24. A gear 56 (the teeth are unillustrated), which serves as the other portion of the conveying means and engages the gear 52, is fixed to the intermediate portion of the shaft 54. A reel 58 serving as a winding shaft is fixed to the lower side (the direction of arrow D) of the gear 56. As shown in FIGS. 1 and 3, the reel 58 is disposed at the inner side of a reel accommodating chamber 60 provided at the main body case 12.

As illustrated in FIG. 3, an arc-shaped film presser 64 is provided at the reel accommodating chamber 60. The film presser 64 is swingably supported at the main body case 12 by a pin 65. A roller 66 is attached to the tip end of the film presser 64. The film presser 64 is urged by a spring 67 so as to press the reel 58.

As shown in FIGS. 1 and 3, a window portion 68 to view the film 106 is formed at the central portion of the main body case 12. The window portion 68 penetrates through the main body case 12 in the direction of arrow F and in the direction of arrow B. The window portion 68 is formed so that the lateral dimension thereof is slightly larger than one image frame of the film 106 and the longitudinal dimension thereof is slightly larger than the width of the film 106.

As shown in FIG. 3, a slit 70 is formed at the main body case 12. The slit 70 is formed along the transverse direction (the direction of arrow R and the direction of arrow L) of the main body case 12 so as to cross the window portion 68. At the side of the direction of arrow L, the slit 70 is connected to the cartridge accommodating concave portion 32. At the side of the direction of arrow R, the slit 70 is connected to the reel accommodating chamber 60.

The width of the slit 70 is constant over substantially the entire length thereof. A projection 72, which has a taper portion at the cartridge accommodating concave portion 32 side, is formed in the vicinity of the cartridge accommodating concave portion 32. Film guides 74, such as teremp or felt, which are made of a flexible material and which prevent damage to the film 106, or film guide rollers are adhered to or provided toward the slit 70 constituting inner surfaces.

As shown in FIGS. 3 and 4, transparent guide plates 76, which guide non-image areas at the transverse direction sides of the film 106, are provided at the window portion 68. The two transparent guide plates 76 oppose each other via a predetermined gap through which the film 106 passes.

Next, the operation of the present embodiment will be described.

The post 110 of the spool 102 is removed from the cartridge 100 after the user is informed that the film 106 accommodated within the cartridge 100 has been developed. Accordingly, the state of the film 106 (whether the film 106 has been developed) can be recognized without withdrawing the film 106 from inside.

In order to view the film 106 accommodated within the cartridge 100, the bottom cover 36 of the film viewer 10 is opened and the cartridge 100 is inserted into the cartridge accommodating concave portion 32.

If the film 106 inside of the inserted cartridge 100 is a developed film, the bottom cover 36 can be closed because the post 110 has been removed. However, if the film 106 inside of the inserted cartridge 100 is an undeveloped film, the post 110 abuts the projection 35 of the bottom cover 36 so that the bottom cover 36 is not closed. Consequently, the cartridge 100 cannot be accommodated and the undeveloped film 106 is prevented from being exposed. Namely, if there are a cartridge having a developed film and a cartridge having an undeveloped film, the undeveloped film is not erroneously exposed.

In order to view the film 106 accommodated within the cartridge 100 in the cartridge accommodating concave portion 32, the knob 46 is turned from the left to the right by a finger. (See FIGS. 1 through 3. In FIG. 2, the knob 46 is turned counterclockwisely.) Accordingly, the gear 28 rotates counterclockwisely and thus the film 106 is conveyed to the right (the direction of arrow R). At the same time, the gear 56 and the reel 58 rotate counterclockwisely. The film 106 withdrawn from the cartridge 100 is immediately guided by the film guides 74, which are made of a flexible material. Further, the transverse direction end portions of the film 106 are guided by the transparent guide plates 76 and reach the reel accommodating chamber 60 via the window portion 68. The tip end of the film 106 is wound around the reel 58 while being guided by the inner wall of the reel accommodating chamber 60 and the film presser 64.

By using the film viewer 10 in the above-mentioned manner, the film 106 can be viewed without touching the film 106. Accordingly, the image quality is not deteriorated by, for example, thumbing the film 106 or scratching the surfaces of the film 106. In addition, as stated above, the window portion 68 is formed so that the lateral dimension thereof is slightly larger than one image frame of the film 106 and the longitudinal dimension thereof is slightly larger than the width of the film 106, and further, the both end portions of the film 106 are supported by the transparent guide plates 76. Consequently, it is possible to read not only the entire recorded image, but also the frame number of the images recorded on the transverse direction end portions of image areas, the product number of the film, and optical information such as bar code. Further, it is possible to read the result of an accident such as fog, or unsatisfactory conveying of a film in a camera, or unsatisfactory positioning of a camera at the time of photographing.

When the film 106 is conveyed to the left (the direction of arrow L) or when the film 106 is rewound around the cartridge 100, it suffices if the knob 46 is rotated from the right to the left (clockwisely).

The second embodiment of the present invention will be explained in accordance with FIGS. 7 through 10. Structures or elements similar to those of the first embodiment are designated by the same reference numerals, and descriptions thereof are omitted.

In the aforementioned embodiment, an inexpensive apparatus is provided. However, in the second embodiment, more functions are added to the apparatus. Namely, if it is a negative film or a black and white film, the images are viewed by using outside light as in the above embodiment. However, if it is a reversal film, it is desirable that a light source is built in the apparatus to view the images. Further, it is more convenient if winding and rewinding of the film is automatic. An example having such additional functions is described hereinafter as the second embodiment.

Figure 7:
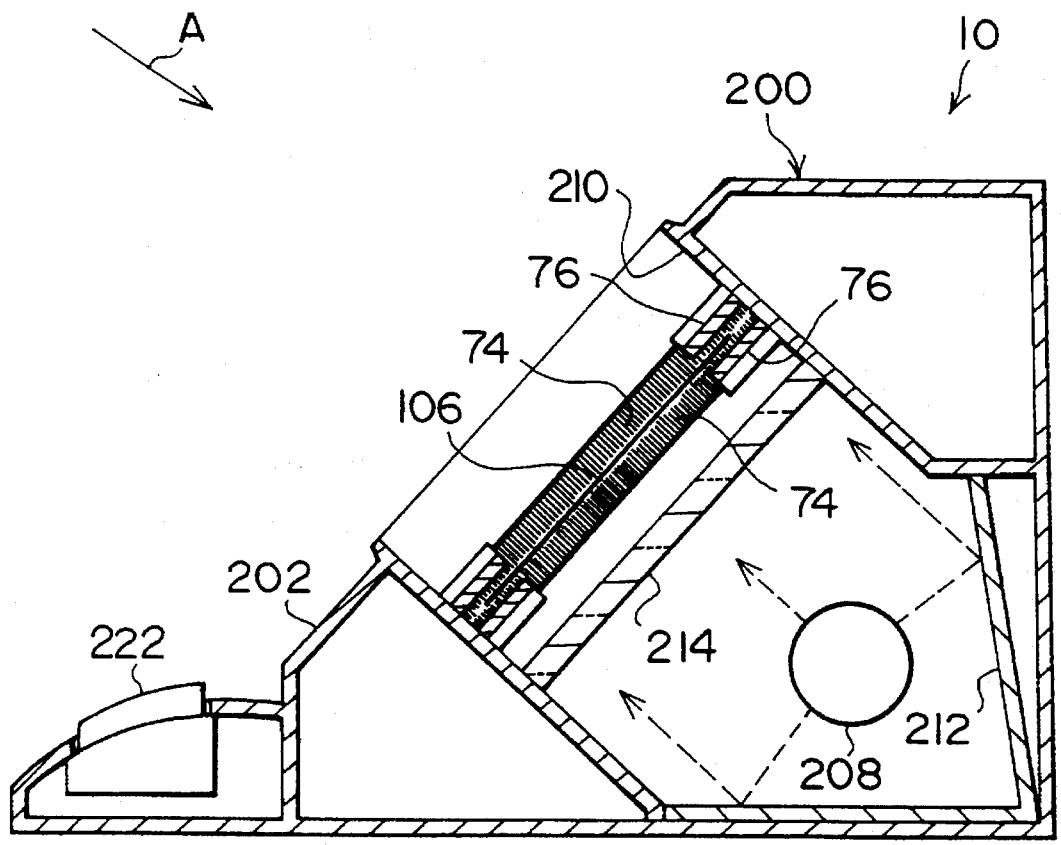
FIG. 7 is a cross-sectional view (a cross-sectional view, taken along line 7—7 of FIG. 8) of a film viewer according to a second embodiment.

As illustrated in FIG. 7, a main body case 200 of the film viewer 10 of the present embodiment includes a front plate 202 which is inclined at an angle of about 45 degrees. A window portion 210 opens at a substantially central portion of the front plate 202.

Figure 8:
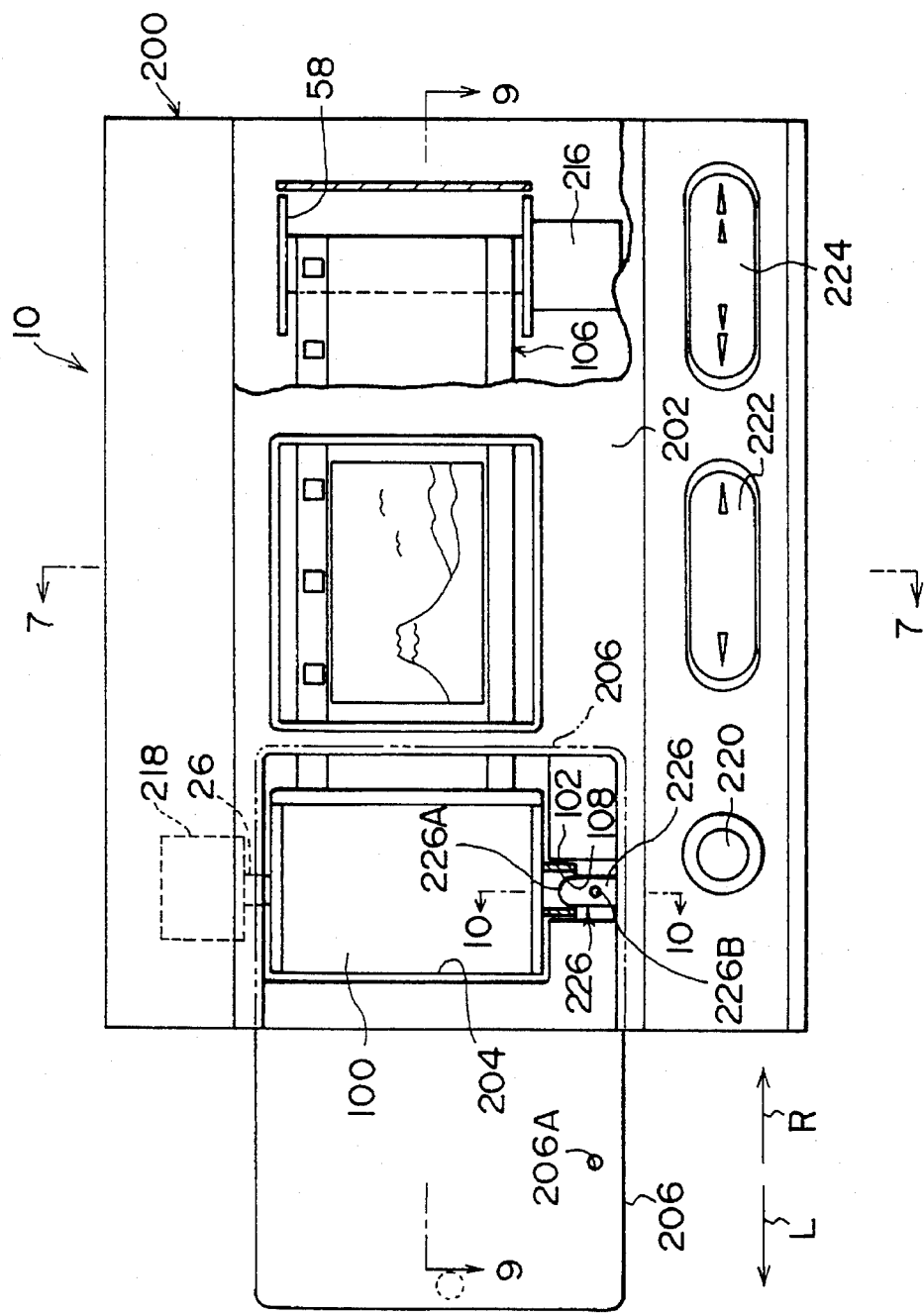
FIG. 8 is a perspective view, in the direction of arrow A, of the film viewer shown in FIG. 7.

As illustrated in FIG. 8, a cartridge accommodating concave portion 204 opens at the front plate 202 side and is closed by a cover 206.

Figure 9:
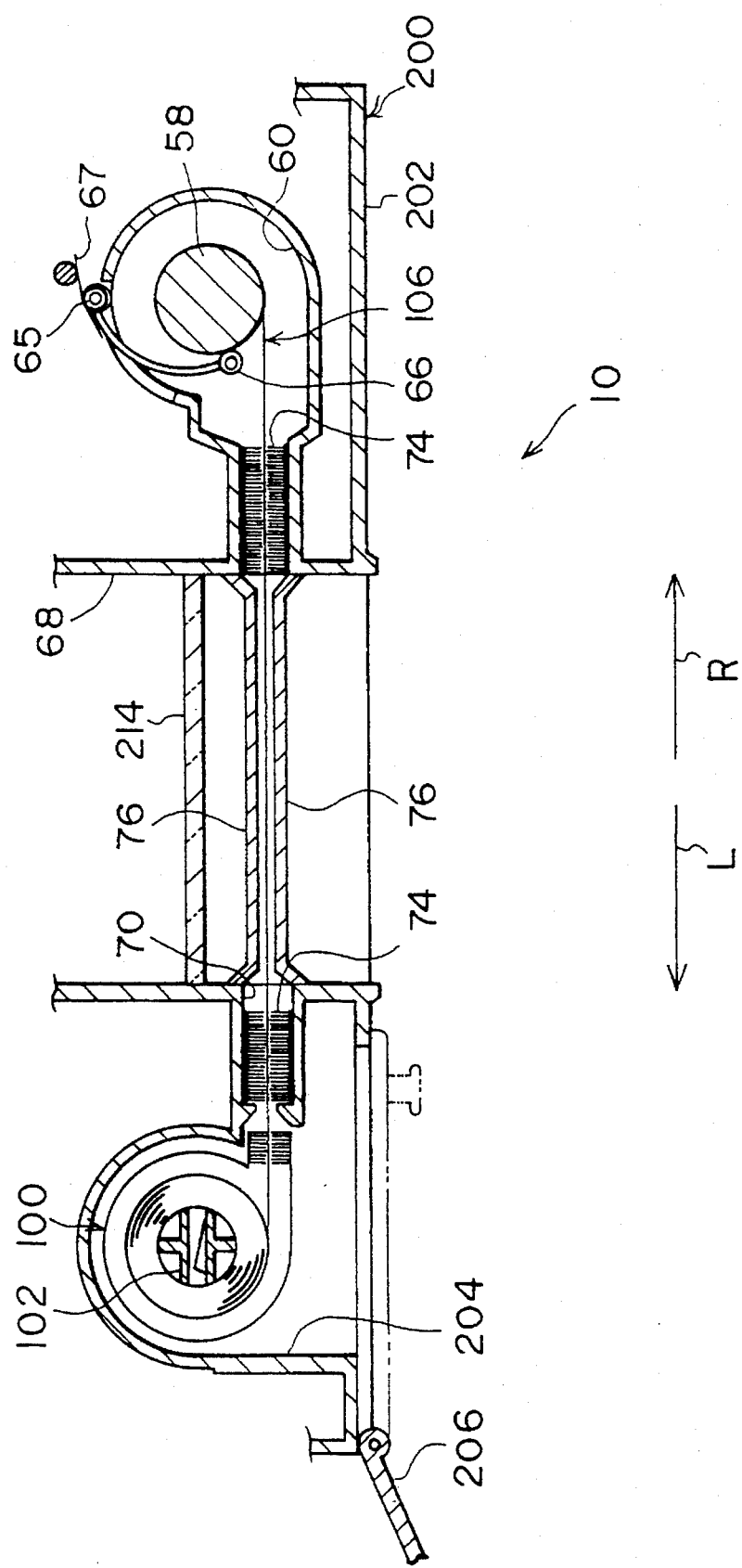
FIG. 9 is a cross-sectional view, taken along line 9—9, of the film viewer shown in FIG. 8.

As illustrated in FIGS. 7 and 9, within the main body case 200, a lamp 208 is disposed at the rear side of the conveying surface of the film 106. Moreover, a reflecting mirror 212 is attached to the corner portion of the main body case 200 for reflecting the light from the lamp 208 to the window portion 210 side. Further, a white plate 214, which transmits the light, is disposed between the lamp 208 and the film 106. As a result, images of the film have few irregularities in illumination and the appearances thereof can improve.

As illustrated in FIG. 8, a motor 216 serving as a portion of the conveying means is connected to the reel 58, and a motor 218 serving as another portion of the conveying means is connected to the shaft 26, which rotates the spool 102.

The motor 216 and the motor 218 are connected to a main switch 220, a creep speed feeding switch 222, a rapid feeding switch 224, a controlling circuit, and an unillustrated power source (a battery or the like). The lamp 208 is connected to the power source and the main switch 220.

When the main switch 220 is turned on, the lamp 208 is lit. When the left side of the creep speed feeding switch 222 is pressed, the film 106 is conveyed in the direction of arrow L at a creep speed. When the right side of the creep speed feeding switch 222 is pressed, the film 106 is conveyed in the direction of arrow R at a creep speed. When the left side of the rapid feeding switch 224 is pressed, the film 106 is rapidly conveyed in the direction of arrow L. When the right side of the rapid feeding switch 224 is pressed, the film 106 is rapidly conveyed in the direction of arrow R.

Figure 10A:
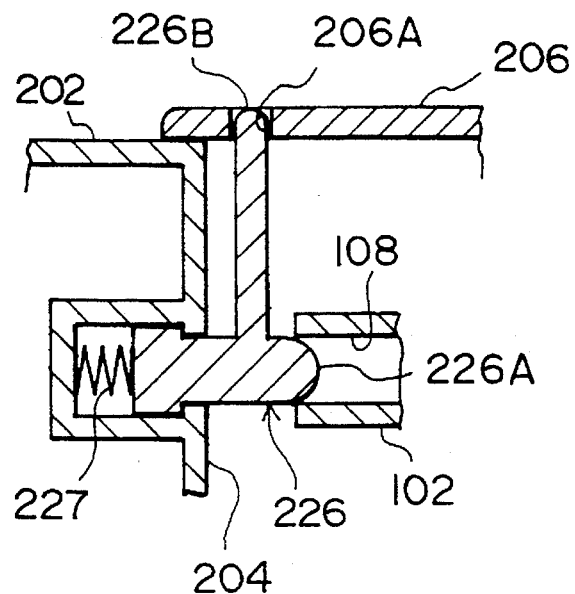
FIG. 10A is a cross-sectional view illustrating a state of a cover when a cartridge accommodates a developed film.

As shown in FIGS. 8 and 10, an L-shaped lever 226, which serves as a preventing means, is movably supported along the axial direction of the spool 102 by the side wall of the cartridge accommodating concave portion 204 of the main body case 200. The lever 226 is urged at the spool 102 side by a spring 227. As shown in FIG. 10A, in a case in which the spool 102 has no post 110 (the case in which the film has been developed), a semicircular end portion 226A of the lever 226 is inserted into the concave portion 108 of the spool 102, and a branch portion 226B, which extends sideways, is inserted into an aperture 206A of the cover 206 so as to close the cover 206.

Figure 10B:
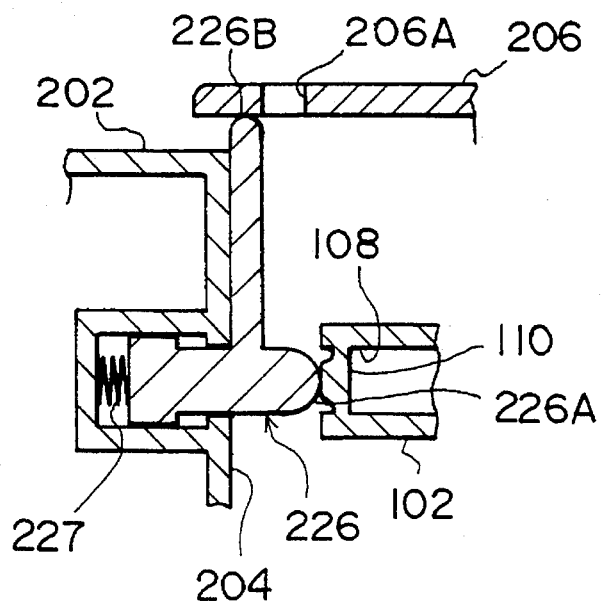
FIG. 10B is a cross-sectional view illustrating a state of a cover when a cartridge accommodates an undeveloped film.

On the other hand, as illustrated in FIG. 10B, if the post 110 is attached to the spool 102 (the case in which the film has not developed), the lever 226 retracts by being pushed by the post 110, and the branch portion 226B is not inserted into the aperture 206A of the cover 206. Therefore, the cover 206 is not closed.

Thus the cover 206 is not closed in the case of the cartridge 100 having the undeveloped film 106. Therefore, the cartridge 100 cannot be accommodated, and consequently, the undeveloped film 106 can be prevented from being exposed.

In the film viewer 10 of the present embodiment, the film 106 withdrawn from the cartridge 100 is immediately guided by the film guides 74, which are made of a flexible material. Accordingly, its image quality is not deteriorated by, for example, thumbing the film 106 or scratching the surfaces thereof. Further, the window portion 210 is formed so that the lateral dimension thereof is slightly larger than one image frame of the film 106 and the longitudinal dimension thereof is slightly larger than the width of the film 106. The both end portions of the film 106 are supported by the transparent guide plates 76. Accordingly, it is possible to read not only the entire recorded image, but also the frame number of the images recorded on the transverse direction end portions of the image areas, the product number of the film, and the optical information such as bar code, similarly to the first embodiment.

Further, since the film viewer 10 of the present embodiment has a structure which can convey the film 106 by the motors, search can be effected very rapidly. Moreover, since the lamp 108 is provided, the film 106 can be viewed even in a dark place.

In order to view the film 106 more easily, a magnifying lens can be mounted to the window portion 210.

Figure 11:
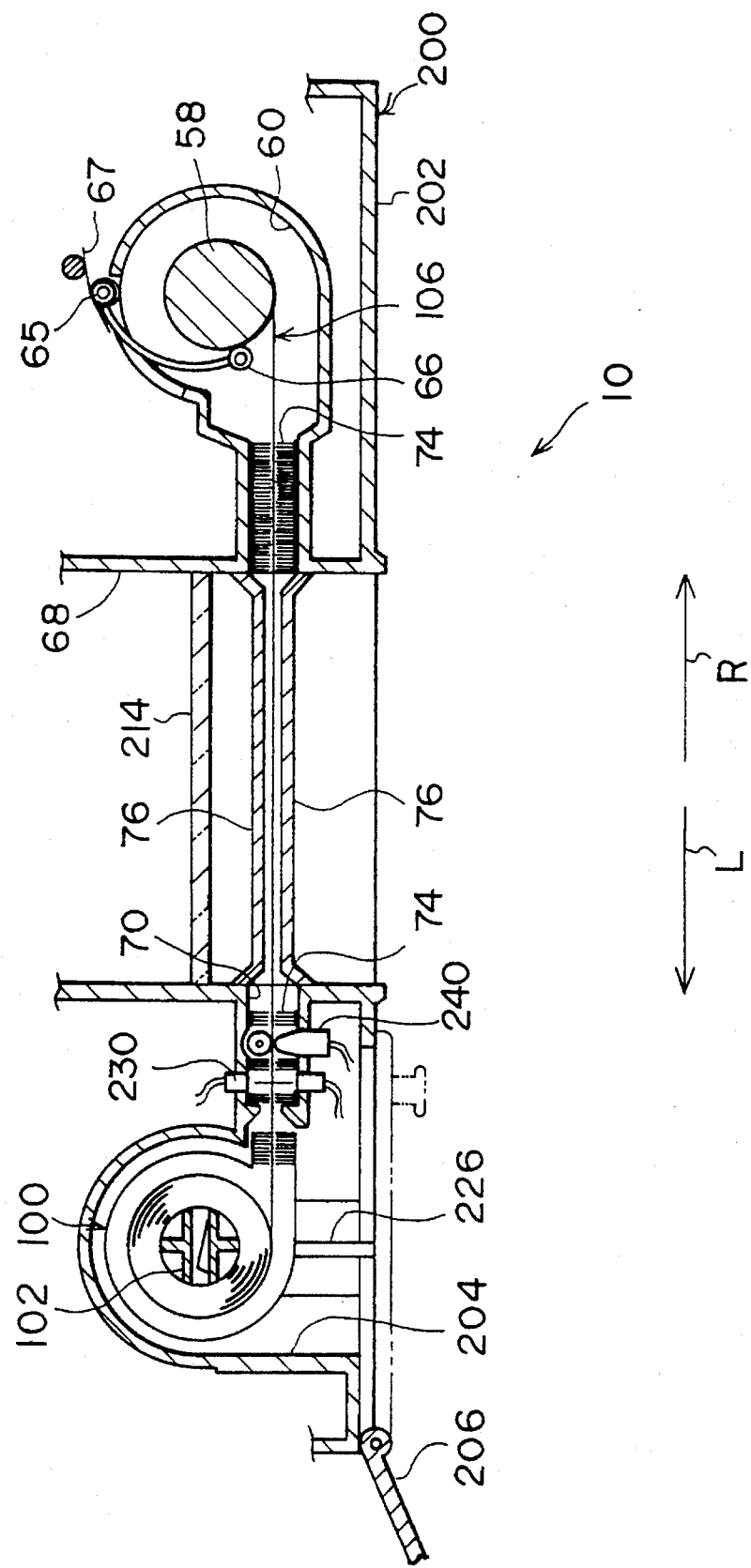
FIG. 11 is a cross-sectional view illustrating another embodiment of the film viewer.

There is a case in which the film 106 has optical information (e.g., a bar code or a dot) or magnetic information (in the case that a magnetic recording layer is formed on the film) other than images. As shown in FIG. 11, in order to read the optical information and the magnetic information, a transmission type light sensor 230 and a magnetic head 240 may be provided at the slit 70. An infrared sensor of transmission type (unillustrated), which is similar to the light sensor 230, may be provided in the very vicinity of the entrance/exit port for the film of the cartridge 100. In this aspect, when the tip end of the film 106 withdrawn from the cartridge 100 passes through the infrared sensor, a determination as to whether the film 106 has been developed is made from the difference in transmittance rates of the infrared rays. If the infrared sensor is connected to a control circuit, the motors 216, 218 are immediately stopped at the time of feeding the portion of the tip end of the undeveloped film 106 out of the cartridge 100, thereby preventing the exposure of the undeveloped film 106 (destruction of the latent images). By providing this sensor, the accident of fogging the film 106 can be prevented even if a pawl or mechanism, which distinguishes whether the film 106 has been developed, is in an abnormal state.

Besides using the infrared rays, a sensor which detects the thickness of the film 106 or the existence of silver may be provided so that a determination is made as to whether the film 106 has been developed. Alternatively, the magnetic head 240 can be used for recording various types of magnetic information on the magnetic recording layer of the film 106.

The information which is recorded on the film can include various types of information inputted by the camera (date, time, print size, pseudo zoom, and instructions to change an aspect ratio), photographing conditions by the camera (a value F of its lens, a value f of an iris diaphragm, shutter speed, use of electronic flash, photometric value, film speed, intended amount of correcting exposure, distance from the camera to a principal photographed subject, and title of a photograph), ordered number of prints, exposure conditions when the film is printed, prices for developing or printing the film, processed time at a laboratory, special information about a user, period from the time when the film is shipped to the time when the film is ordered. The information can also be used for issuing slips or the like at a laboratory or at a printing shop.

What is claimed is:

1. A film viewer for viewing a film which has been withdrawn from a cartridge, comprising:

a rotational shaft which is connected to a spool of said cartridge;

a winding shaft which winds said film;

a main body which supports said rotational shaft and said winding shaft such that said rotational shaft and said winding shaft are rotatable;

a cartridge accommodating portion which is provided at said main body and which accommodates said cartridge;

a window portion for viewing which is provided between said rotational shaft and said winding shaft and which is at least as large as one image frame of said film;

a film guide which is made of a flexible material, said film guide being mounted to said main body and disposed in a vicinity of an entrance/exit port for the film of said cartridge so as to guide said film;

a conveying means which is provided so as to connect, one of directly and indirectly, said rotational shaft and said winding shaft, or which is provided at each of said shafts, said conveying means conveying said film while driving the shafts; and a distinguishing means which is provided at said main body, said distinguishing means distinguishing whether the film has been developed, from at least one of the film itself and indicating means, which is provided at the cartridge and which indicates whether the film within the cartridge has been developed.

2. A film viewer according to claim 1, wherein said indicating means distinguishes whether the film has been developed by detecting said indicating means, and in a case in which the film is undeveloped, said distinguishing means prevents the cartridge from being accommodated.

3. A film viewer according to claim 2, wherein said distinguishing means is an engaging body, and in a case in which, within the spool if the film, there is no small piece which serves as said indicating means, said distinguishing means engages the spool, and in a case in which, within the spool of the film, there is a small piece which serves as said indicating means, said distinguishing means does not engage the spool and thus prevents the cartridge from being accommodated.

4. A film viewer according to claim 1, wherein said distinguishing means is a sensor which is provided in a vicinity of said cartridge accommodating portion and which distinguishes whether the film has been developed.

5. A film viewer according to claim 2, wherein said distinguishing means further comprises a sensor which is provided in a vicinity of said cartridge accommodating portion and which distinguishes whether the film has been developed.

6. A film viewer according to claim 1, wherein said conveying means is connected to both said rotational shaft and said winding shaft, and which manually rotates said shafts.

7. A film viewer according to claim 1, wherein said conveying means is at least one motor which is connected to both of said rotational shaft and said winding shaft and which rotates the shafts by an electric signal.

8. A film viewer according to claim 1, wherein a speed controller is provided for controlling a rotational speed of a motor.

9. A film viewer according to claim 1, wherein a light source which irradiates light to said window portion for viewing is provided at said main body.

10. A film viewer according to claim 1, wherein at said main body is provided a reflecting mirror which receives light from the light source and which reflects the light to said window portion for viewing.

11. A film viewer according to claim 1, wherein a magnifying lens which can cover said window portion for viewing is provided at said main body.

12. A film viewer according to claim 1, wherein, at a position at which information other than images recorded on the film which has been withdrawn from the cartridge can be read, a means for reading the information is provided at said main body.

13. A film viewer according to claim 1, wherein, at a position in which information other than images on the film which has been withdrawn from the cartridge can be written, a means for writing the information is provided at said main body.

* * * * *